United States Patent
Iwamoto et al.

(10) Patent No.: US 7,947,205 B2
(45) Date of Patent: May 24, 2011

(54) METHOD AND APPARATUS FOR REMOVING A DISSIMILAR MATERIAL

(75) Inventors: Hiroshi Iwamoto, Osaka (JP); Takao Hisazumi, Osaka (JP)

(73) Assignee: Panasonic Corporation, Osaka (JP)

( * ) Notice: Subject to any disclaimer, the term of this patent is extended or adjusted under 35 U.S.C. 154(b) by 361 days.

(21) Appl. No.: 10/593,894

(22) PCT Filed: May 26, 2005

(86) PCT No.: PCT/JP2005/009683
§ 371 (c)(1), (2), (4) Date: Sep. 22, 2006

(87) PCT Pub. No.: WO2005/115709
PCT Pub. Date: Dec. 8, 2005

(65) Prior Publication Data
US 2007/0145628 A1    Jun. 28, 2007

(30) Foreign Application Priority Data
May 27, 2004   (JP) ................................ 2004-157384

(51) Int. Cl.
    *B29B 17/02*    (2006.01)
    *B26F 1/38*     (2006.01)
(52) U.S. Cl. ............... 264/155; 83/165; 83/466; 269/56
(58) Field of Classification Search ............ 264/155; 83/165, 466; 269/56, 58, 59, 71, 287
See application file for complete search history.

(56) References Cited

U.S. PATENT DOCUMENTS

| | | | | |
|---|---|---|---|---|
| 2,299,818 A * | 10/1942 | Gross | | 83/109 |
| 2,364,334 A * | 12/1944 | Wold | | 83/165 |
| 4,089,244 A * | 5/1978 | Herb et al. | | 83/220 |
| 4,355,556 A | 10/1982 | Ulsky | | |
| 5,682,657 A * | 11/1997 | Hirose | | 29/33 J |
| 5,787,751 A * | 8/1998 | Argiropoulos | | 72/339 |
| 6,209,431 B1 * | 4/2001 | Wickham | | 83/165 |
| 2004/0149096 A1 * | 8/2004 | Ide et al. | | 83/98 |

FOREIGN PATENT DOCUMENTS

| | | |
|---|---|---|
| DE | 37 39 675 A1 | 6/1989 |
| DE | 296 15 032 U1 | 10/1996 |
| EP | 0 875 344 A1 | 4/1997 |
| JP | 2001 300896 A | 10/1930 |
| JP | 11 114957 | 4/1999 |

(Continued)

OTHER PUBLICATIONS

Partial machine translation of JP2002-137225 obtained from JPO website.*

(Continued)

*Primary Examiner* — Richard Crispino
*Assistant Examiner* — Robert Dye
(74) *Attorney, Agent, or Firm* — McDermott Will & Emery LLP

(57) ABSTRACT

A method and apparatus for efficiently removing a dissimilar material as part of a recycling process, which are free of problems in the terms of worker safety and the work environment, are provided. With the apparatus of the present invention, a working unit is operated to move a blade unit while pressing a plastic product from the outside thereof to punch out the dissimilar material.

1 Claim, 7 Drawing Sheets

FOREIGN PATENT DOCUMENTS

| | | | |
|---|---|---|---|
| JP | 2001-89021 A | | 4/2001 |
| JP | 2001-315091 A | | 11/2001 |
| JP | 2002-137225 | * | 5/2002 |
| JP | 2002-137225 A | | 5/2002 |
| JP | 2002-346991 A | | 12/2002 |
| JP | 2003-290756 A | | 10/2003 |
| WO | WO 99/30878 | | 6/1999 |

OTHER PUBLICATIONS

Partial machine translation of JP2001-089021 obtained from JPO website.*

Supplementary European Search Report, issued in corresponding European Application No. 05743713.9, dated on Jun. 11, 2007.

* cited by examiner

METHOD AND APPARATUS FOR REMOVING A DISSIMILAR MATERIAL

RELATED APPLICATION

This application is a national phase of PCT/JP2005/009683 filed on May 26, 2005, which claims priority from Japanese Application No. 2004-157384 filed on May 27, 2004, the disclosures of which Applications are incorporated by reference herein. The benefit of the filing and priority dates of the International and Japanese Applications is respectfully requested.

TECHNICAL FIELD

The present invention relates to a method for removing a dissimilar material, and more particularly relates to a method and apparatus for removing a dissimilar material form a plastic product.

BACKGROUND ART

Waste plastic discarded from homes and elsewhere has so far been incinerated or dumped in landfill, but this has led to societal problems such as negative impact on the global environment and a lack of landfill sites. Consequently, measures aimed at recycling waste plastic have been adopted in recent years, and there is now a need for recycling methods and apparatus that were not really considered necessary in the past.

The above-mentioned waste plastic is contained in large quantities in used consumer electrical products. In particular, plastic is used in the housings of television sets and personal computer displays, so there is a need to recycle these plastics.

In material recycling, which is one recycling method, plastic products have to be precisely identified and sorted for each type of plastic, and any dissimilar materials that are attached to the plastic products have to be eliminated. This is because if the plastic is recycled while it still contains a dissimilar material, this will adversely affect the quality and properties of the regenerated plastic. For example, a television set or computer display housing includes not only the plastic of which the housing itself is made, but also paper labels and cloth speaker netting that are applied with an adhesive. Furthermore, plastic parts made of different materials, such as switches, or metallic speaker netting may be attached. Up to now, to eliminate these dissimilar materials, the worker had to cut them off with a tool or remove them by applying heat.

Patent Document 1: Japanese published unexamined patent application No. 2001-89021

DISCLOSURE OF THE INVENTION

As discussed above, since the work entailed by a convention method for removing a dissimilar material was manual work performed by a worker, the removal was a major job and efficiency was poor. Another problem was that when the unnecessary portion was cut away with a power tool, hydraulic tool, or the like, the fixing of the plastic product could become unstable, which would endanger the safety of the worker, and cutting dust was scattered, which adversely affected the working environment.

The present invention was conceived in an effort to solve the above problems, and it is an object thereof to provide a method and apparatus for removing a dissimilar material, with which a dissimilar material that is different from the material of a plastic product can be efficiently removed from the plastic product, and there are no problems in terms of workplace safety or the working environment.

To achieve the stated object, the present invention is constituted as follows.

The first invention is a method for removing a dissimilar material, which is attached to a plastic product and is different from the material of the plastic product, from the plastic product, comprises supporting the plastic product by pressing from the outside of the plastic product, and punching out the dissimilar material.

With this method, efficiency is high because the dissimilar material is mechanically punched out of the plastic product, and because the material is removed by punching, there is no scattering of cutting dust or the attendant problems with the working environment.

The second invention is the method for removing a dissimilar material according to the first invention, wherein the plastic product is substantially box-shaped, and has at least one opening.

This allows the plastic product to be pressed more securely from the outside.

The third invention is the method for removing a dissimilar material according to the second invention, wherein the plastic product is pressed from the outside of the plastic product lateral face while supporting the plastic product.

With this method, the plastic product can be fixed more securely, affording greater work safety.

The fourth invention is an apparatus for removing a dissimilar material, which is attached to a plastic product and is different from the material of the plastic product, from the plastic product, comprises a seat unit on which the plastic product is placed, a pressing and supporting unit for supporting the plastic product by pressing from the outside of the plastic product, and a punching unit for punching out from the plastic product the dissimilar material that is different from the material of the plastic product.

With this apparatus, efficiency is high because the dissimilar material is mechanically punched out of the plastic product, and because the plastic product is supported by pressure, good work safety can be ensured, and since the material is removed by punching, there is no scattering of cutting dust or the attendant problems with the working environment.

The fifth invention is the apparatus for removing a dissimilar material according to the fourth invention, wherein the punching unit has a blade unit for punching out the dissimilar material, and a working unit for operating the blade unit up and down, the blade unit punches out the dissimilar material by moving up and down, and the working unit is located lower than the seat unit and the blade unit.

With this apparatus, since the working unit is located lower than the seat unit, the working unit is not right in front of the worker, and the plastic product can be easily installed in the seat unit. Also, the work is easier because the worker can directly see the dissimilar material that is to be removed.

Furthermore, since the stroke of the blade unit in the part that is being punched out can be reduced regardless of the vertical height of the plastic product from the seat unit, a more compact apparatus can be obtained.

With the method of the present invention for removing a dissimilar material, as discussed above, a dissimilar material can be efficiently removed without any problems in terms of workplace safety or the working environment. Also, with the apparatus of the present invention for removing a dissimilar material, a compact apparatus that is easy to use can be obtained.

Figure 1:
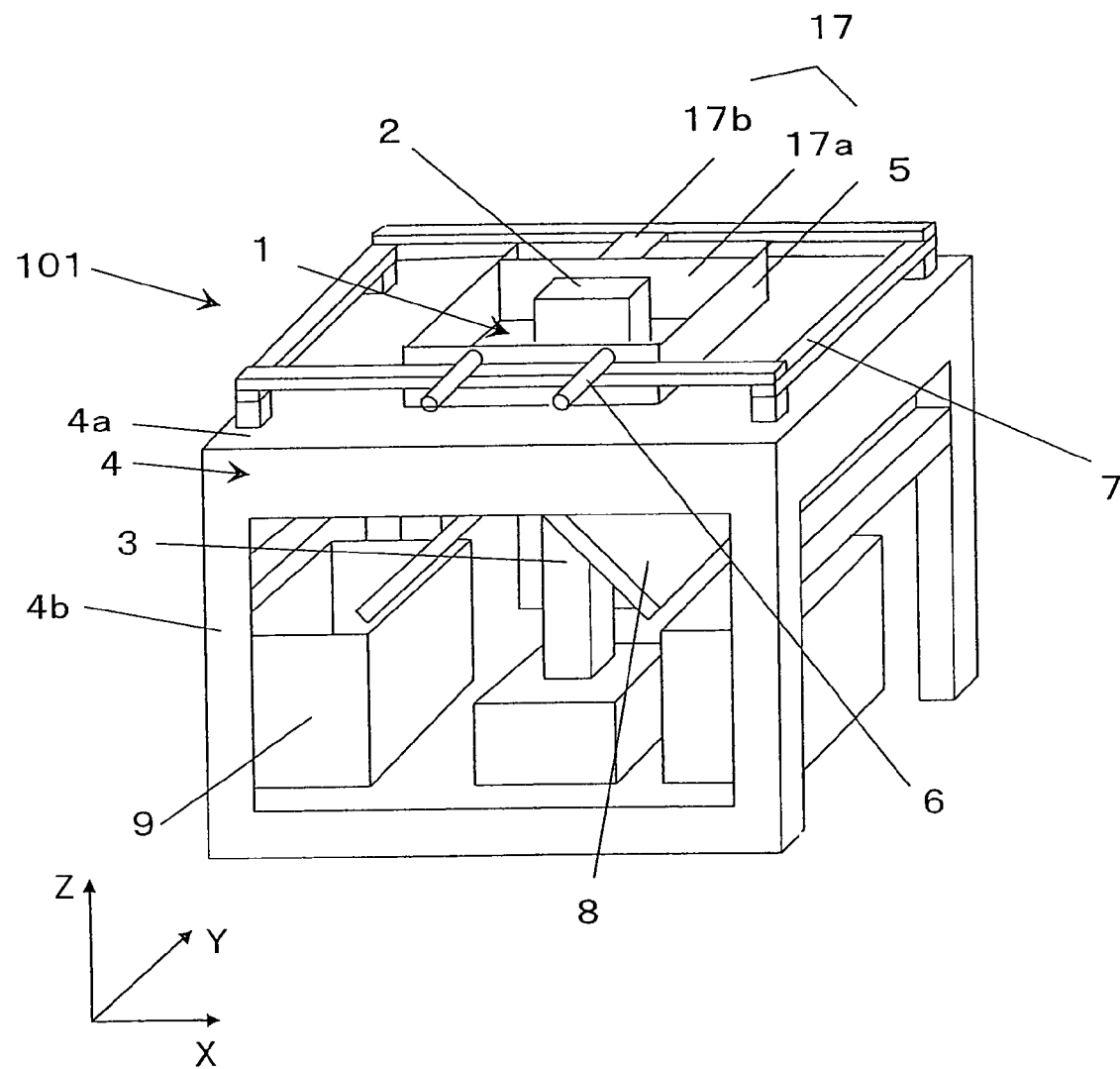
FIG. 1 is a simplified diagram of the dissimilar material removal apparatus pertaining to an embodiment of the present invention.

NUMERICAL REFERENCES 1 punching unit
2 blade unit
3 working unit
3a linking unit
4 seat unit
4a seat face
4b frame
4c hole
5 frame
6 work handle
7 slide rail
8 discharge chute
9 collection box
10 television cabinet
11 side face
12 front face
12a front face opening
13 dissimilar material
14 speaker unit
15 front control panel
16 punched-out portion
17 pressing support unit
101 dissimilar material removal apparatus

PREFFERED EMBODIMENTS OF THE PRESENT INVENTION

The method and apparatus of the present invention for removing a dissimilar material are a removal method and apparatus in which a dissimilar material that is attached to a plastic product and is different from the material of the plastic product is removed from the plastic product. It is preferable if the dissimilar material is punched out while the plastic product is supported by pressing from the outside of the plastic product. The punching unit of the apparatus has a blade unit for punching out the dissimilar material by moving up and down, and a working unit for moving the blade unit up and down. It is preferable if the working unit is located lower in the apparatus than the blade unit and the seat unit on which the plastic product is placed.

As an example of the present invention, a dissimilar material removal method and apparatus 101 will now be described through reference to FIGS. 1 to 7.

Embodiments

In this embodiment, a television cabinet that is substantially box-shaped and has an opening in a front face and in a rear face corresponding to the front face is used as an example of a plastic product.

Figure 2:
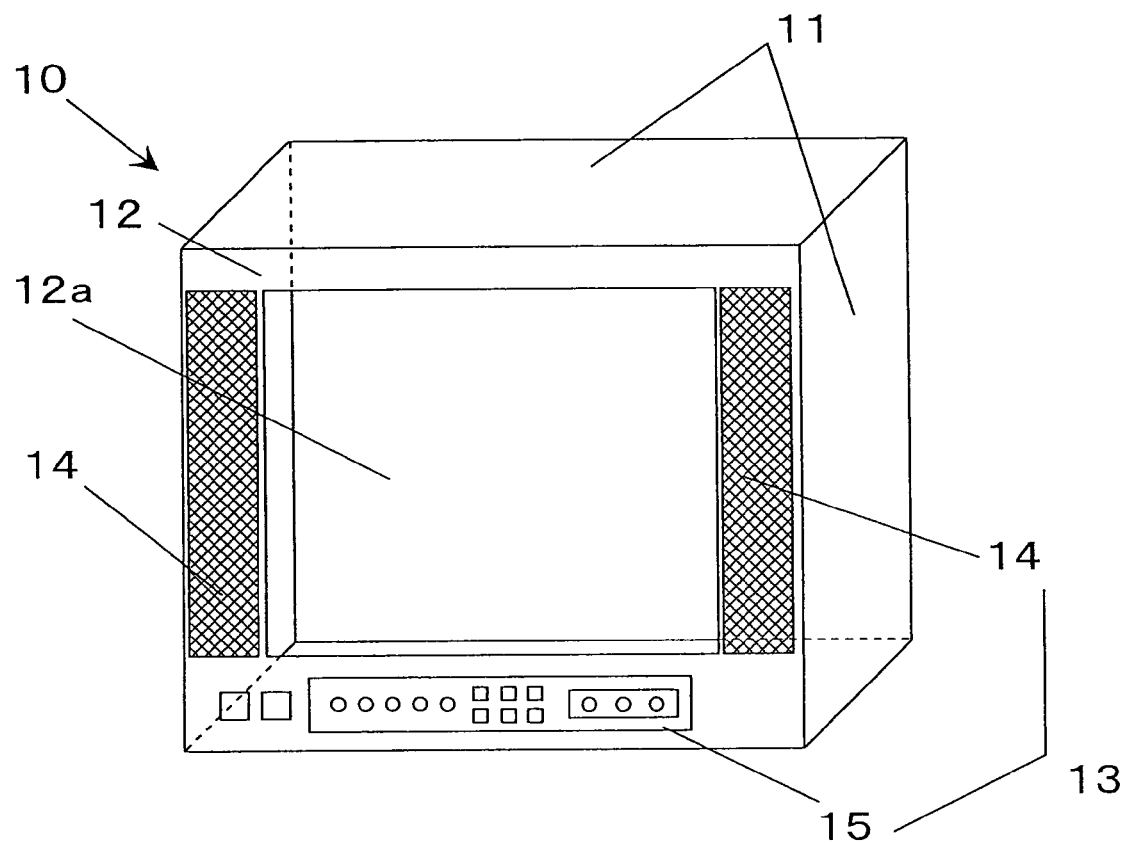
FIG. 2 is a diagram illustrating an example of a television cabinet.

FIG. 1 is a simplified diagram of the dissimilar material removal apparatus 101 of the present invention, FIG. 2 is a diagram illustrating a television cabinet 10 that is a plastic product to which a dissimilar material has been attached, and FIGS. 3 to 7 are diagrams illustrating the dissimilar material removal method and the operation of the apparatus 101 of the present invention.

Figure 3:
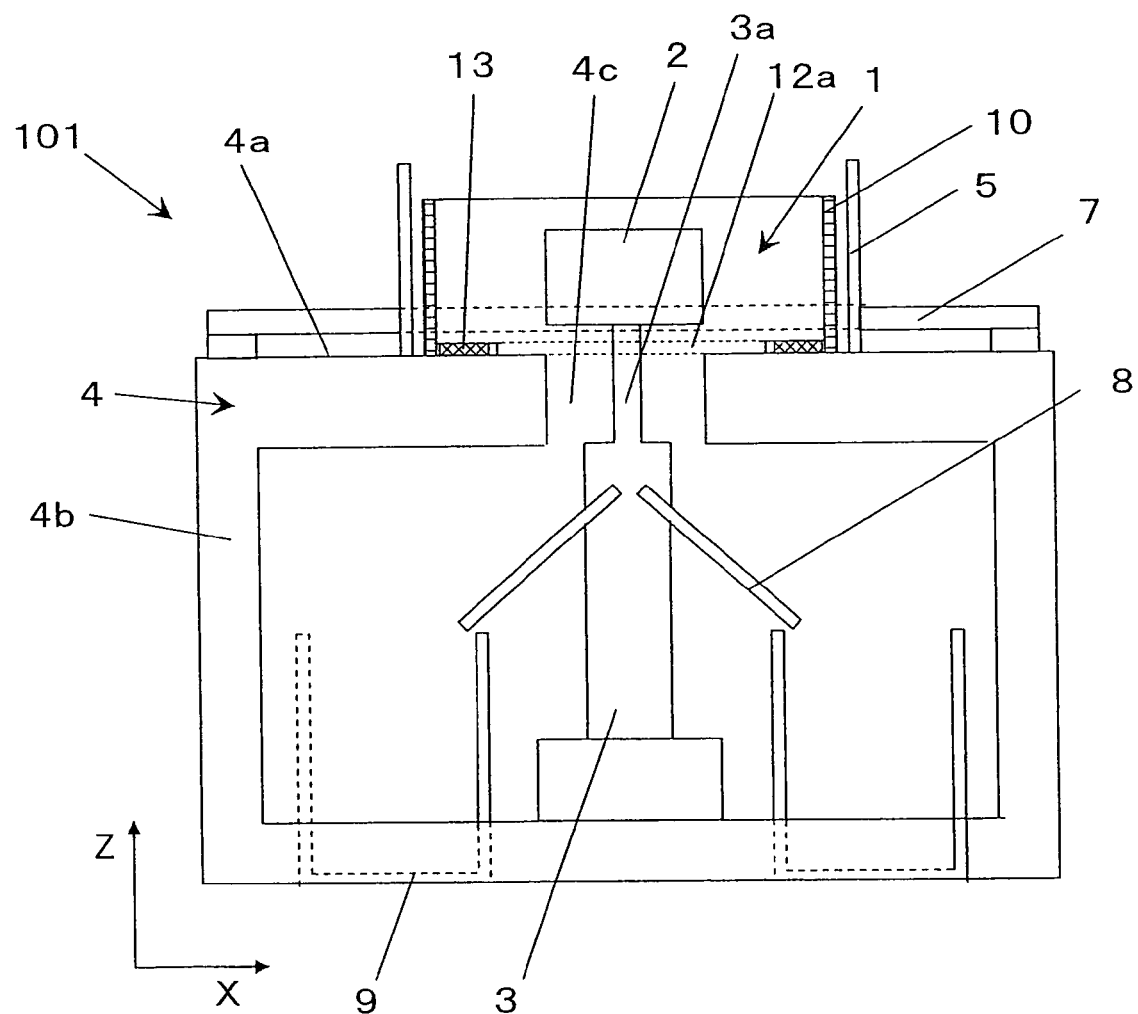
FIG. 3 is a front view of the dissimilar material removal apparatus pertaining to this embodiment, and shows a plastic product being placed.

As shown in FIG. 1, the dissimilar material removal apparatus 101 comprises a punching unit I for punching out from a plastic product a dissimilar material that is different from the material of the plastic product. The punching unit 1 mainly includes a blade unit 2 and a working unit 3. The blade unit 2 is a member for punching out a dissimilar material. The working unit 3 is a mechanism for moving the blade unit 2 up and down, and has a linking unit 3a extending from the main unit, with the upper end of the linking unit 3a linked to the blade unit 2. In this embodiment, the working unit 3 performs punching by moving the blade unit 2 downward. The blade unit 2 is rectangular in shape and is larger than the linking unit 3a, and has blades formed on the lower part of each of its four sides. The blade unit 2 must be made in a size that allows it to pass through an opening 12a in the television cabinet 10. The linking unit 3a passes vertically through a hole 4c (see FIG. 3) in the seat unit 4 (described below). The seat unit 4 is a member on which the plastic product is placed, is formed by a seat face 4a (the upper face) and a frame 4b that supports this seat face 4a, and has a space in its interior. As shown in FIG. 3, the hole 4c passes vertically through the center of the seat face 4a.

The dissimilar material removal apparatus 101 further comprises a frame 5, a work handle 6, and a slide rail 7 on the seat face 4a. The frame 5 is a member disposed slidably over the seat face 4a, includes a rectangular side face unit, and is open above and below. The frame 5 is large enough to allow the plastic product to be installed inside the frame. The plastic product is disposed in the frame 5 and is pressed on by a pressing support unit 17 from the outside of the side faces, and is thereby fixed within the frame 5. The pressing support unit 17 has a pressing plate 17a and a biasing unit 17b. The pressing plate 17a is a flat member disposed within the frame 5, and in this embodiment it extends to the left and right in FIG. 1 and is able to move forward and backward. The biasing unit 17b can impart a biasing force on the pressing plate 17a in the forward direction in FIG. 1, and is driven by a drive unit (not shown).

The work handle 6 is a mechanism for moving the plastic product on the seat face 4a, and is attached to the frame 5. The slide rail 7 is a mechanism for moving and guiding the plastic product over the seat face 4a.

The dissimilar material removal apparatus 101 further comprises a discharge chute 8 and a collection box 9. The discharge chute 8 is a member for discharging the portion of dissimilar material that has been punched out, and has a structure that guides the punched-out portion so that it can be collected more easily. The collection box 9 is used to collect the punched-out portions of dissimilar material conveyed by the discharge chute 8. The discharge chute 8 and the collection box 9 are disposed in the space inside the seat unit 4.

In FIG. 2, the television cabinet 10 has a side face 11 and a front face 12. An opening 12a (the portion in which the television screen is fitted) is formed in the front face 12, and dissimilar materials 13 are provided around the periphery thereof. The dissimilar materials 13 includes speaker units 14 made up of metal or cloth netting, and a front control panel 15 made up of a power switch, remote control signal receiver, name plate, control buttons, and so forth.

The dissimilar material removal method of this embodiment will now be described.

Figure 4:
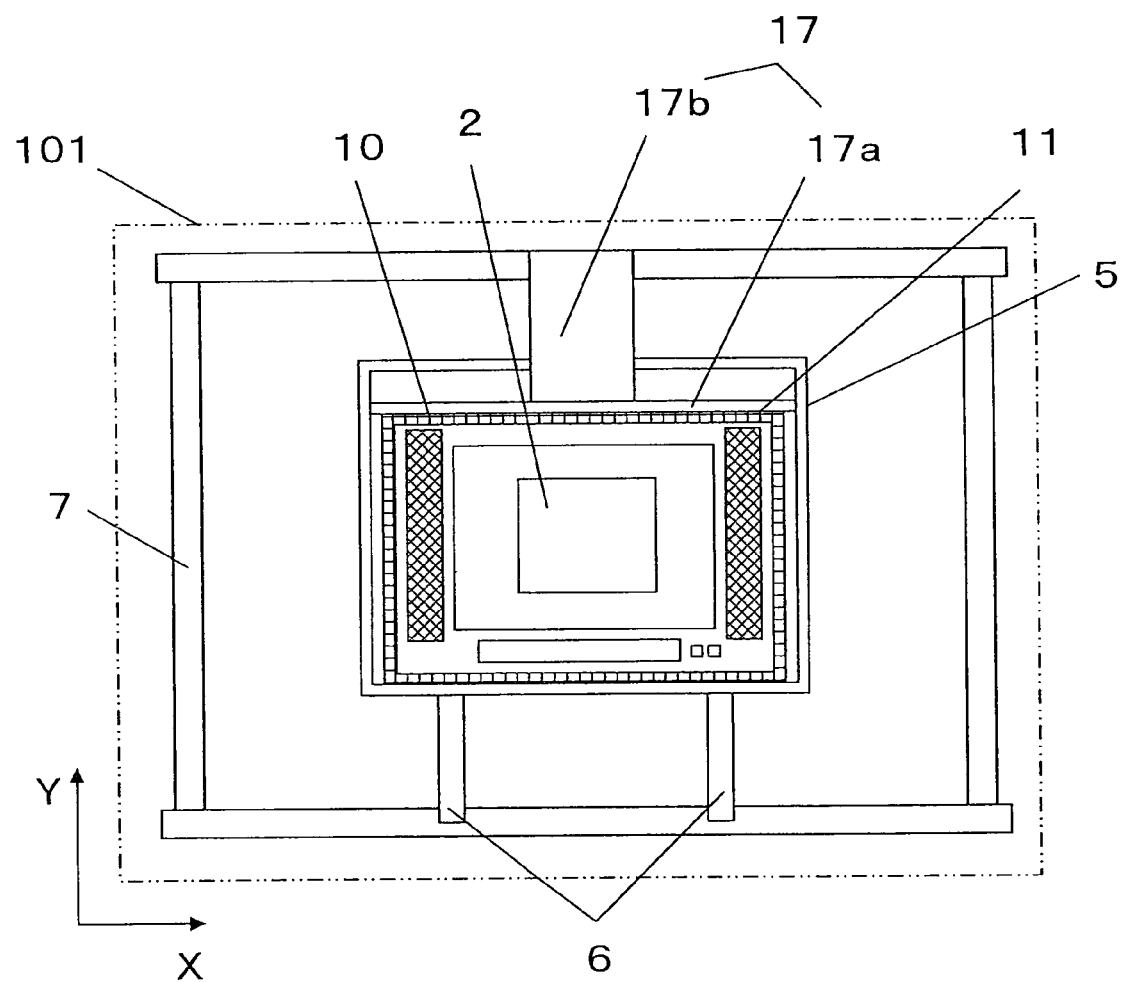
FIG. 4 is a top view of the dissimilar material removal apparatus pertaining to this embodiment, and shows a plastic product being pressed and supported.
Figure 5:
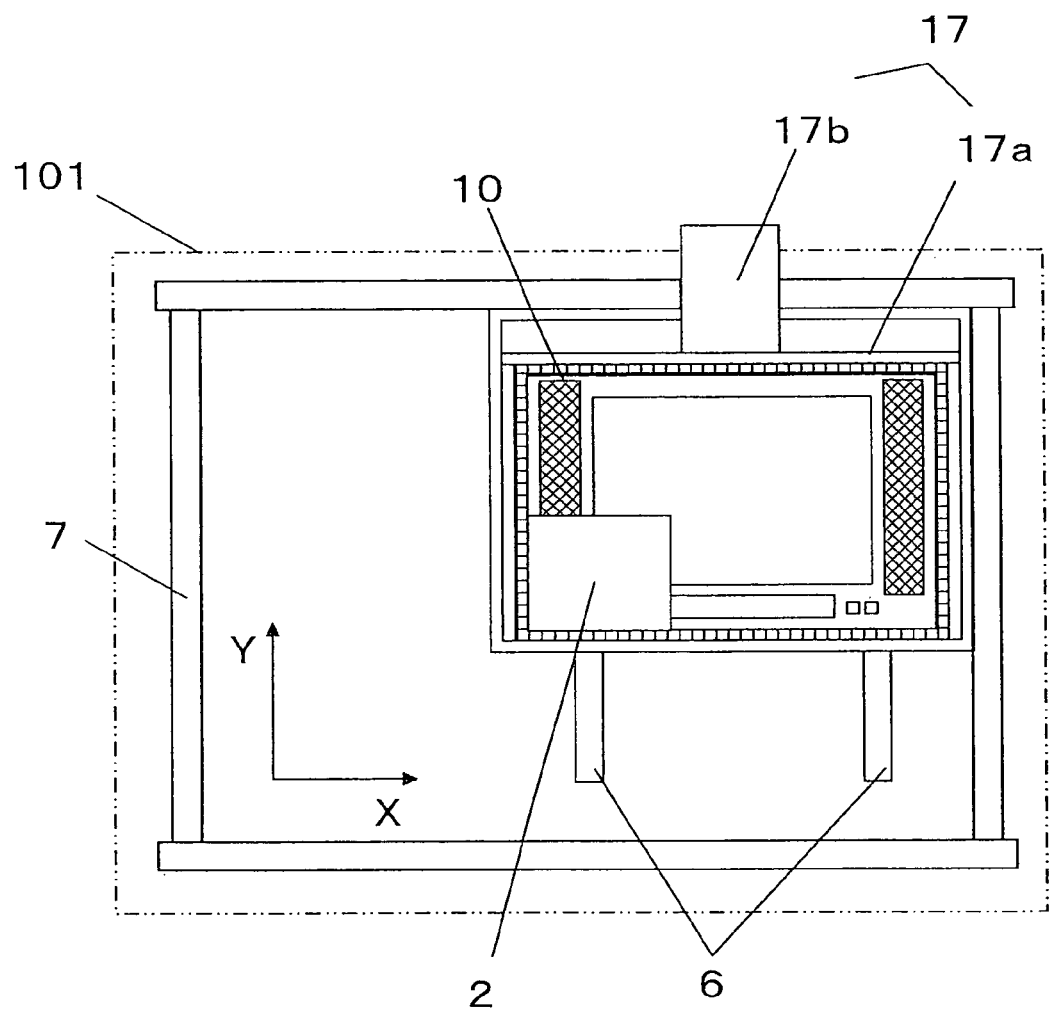
FIG. 5 is a top view of the dissimilar material removal apparatus pertaining to this embodiment, and shows a plastic product that has been moved.
Figure 6:
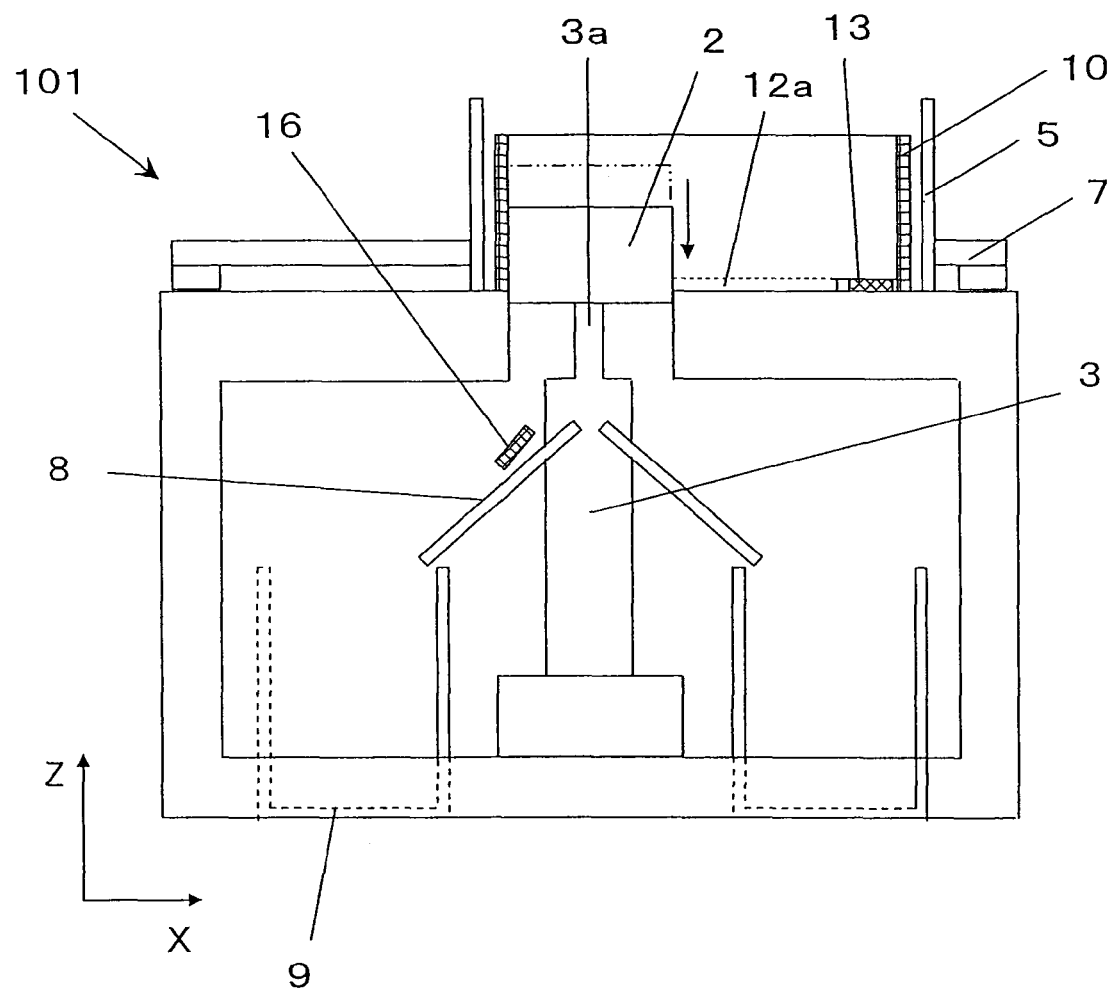
FIG. 6 is a front view of the dissimilar material removal apparatus pertaining to this embodiment, and shows dissimilar material being punched out.
Figure 7:
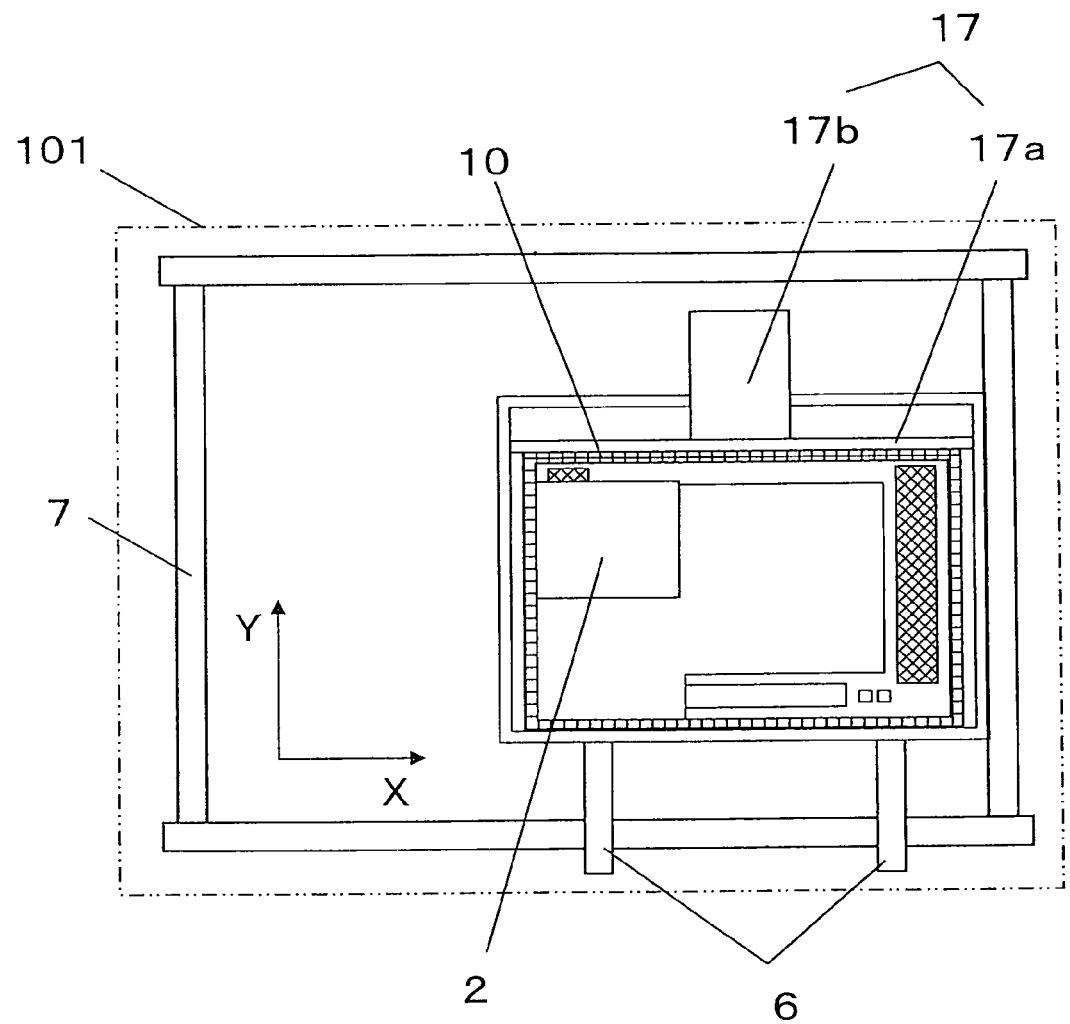
FIG. 7 is a top view of the dissimilar material removal apparatus pertaining to this embodiment, and shows a plastic product that has been moved.

FIG. 3 shows the dissimilar material removal apparatus 101 from the front side (XZ plane), and shows the plastic television cabinet 10 shown in FIG. 2 when it has been installed in the frame 5. The television cabinet 10 is installed with the blade unit 2 passed through the front face opening 12a so that the front face opening 12a, which has the dissimilar materials 13, will be on the seat face 4a side. Next, the apparatus 101 is supported in the frame 5 by being pressed from the outside of the side face 11 of the television cabinet 10 by the pressing support unit 17 as shown in FIG. 4, which is a top view (XY plane). As a result, even if the television cabinet 10 is smaller than the frame 5, for example, it can still be fixed in the dissimilar material removal apparatus 101. The decision to press on the side face 11 is the result of taking the rigidity of the television cabinet 10 into account and selecting a location that can stand up to the pressing. As shown in FIG. 5, when the work handle 6 is operated, the television cabinet 10 is moved along with the frame 5 over the slide rail 7 so that the speaker units 14 and front control panel 15 that are the dissimilar materials 13 will come under the blade unit 2. Then, as shown in FIG. 6, which is a front view (XZ plane) of the apparatus 101, the working unit 3 is moved downward and the blade unit 2 is lowered in the direction of the arrow in the figure to punch out the dissimilar materials 13. In this example, moving the working unit 3 downward makes the apparatus more compact. The punched-out portions 16 of the dissimilar materials 13 are discharged through the discharge chute 8 and collected in the collection box 9. After this, as shown in FIG. 7, which is a top view (XY plane) of the apparatus 101, the work handle 6 is operated so that the television cabinet 10 is moved along with the frame 5 along the slide rail 7 in the X and Y directions in the figure, while the work in FIGS. 5 and 6 is repeated.

The above method allows dissimilar materials 13 to be mechanically punched out from the television cabinet 10, so efficiency is high, and since the television cabinet 10 is supported by pressing, work safety can be ensured. Also, because the materials are punched out, the dissimilar materials 13 can be removed without any scattering of cutting dust or the attendant problems with the working environment.

The plastic product is not limited to a television cabinet, and may be any plastic product of another device or the like to which dissimilar materials are attached.

Also, the place on the plastic product that are pressed and supported is not limited to the side face, as long as it is a location or face that is rigid enough to withstand the pressing on the plastic product.

The direction in the working unit is actuated is not limited to downward, as long as the effect of the present invention can be obtained.

The dissimilar material removal method and apparatus of the present invention are not limited to the above embodiments, as long as the effect of the present invention can be obtained.

INDUSTRIAL APPLICABILITY

The present invention allows dissimilar materials to be removed efficiently without any problems in terms of work safety or the working environment, and can be applied to a various of material cycles.

The invention claimed is:

1. A method for removing a dissimilar material, which is attached to a plastic product and is different from the material of the plastic product, from the plastic product, using a dissimilar material removing apparatus including a seat unit having a seat surface and a frame slidably disposed on the seat surface, a punching unit configured to remove the dissimilar material from the plastic product, and having a blade unit arranged to be insertable into a hole that penetrates the seat surface, and a working unit configured to move the blade unit vertically, comprising the steps of:
   placing the plastic product on the seat surface of the seat unit so that the plastic product is inside the frame;
   punching out a part to be removed by moving the blade unit down after positioning the part to be removed under the blade unit of the punching unit by moving the frame with the plastic product on the seat surface; and
   removing the dissimilar material from the plastic product by repeating the punching step.

* * * * *